(12) United States Patent
Zeidlewicz

(10) Patent No.: US 12,434,916 B2
(45) Date of Patent: Oct. 7, 2025

(54) METHOD FOR OPERATING A CONVEYOR FOR SUCCESSIVE GOODS, AND CORRESPONDING CONVEYOR SYSTEM

(71) Applicant: Dematic Logistics GmbH, Heusenstamm (DE)

(72) Inventor: Lars Zeidlewicz, Emsdetten (DE)

(73) Assignee: Dematic Logistics GmbH, Heusenstamm (DE)

( * ) Notice: Subject to any disclaimer, the term of this patent is extended or adjusted under 35 U.S.C. 154(b) by 96 days.

(21) Appl. No.: 18/556,214

(22) PCT Filed: Apr. 13, 2022

(86) PCT No.: PCT/EP2022/059931
§ 371 (c)(1),
(2) Date: Oct. 19, 2023

(87) PCT Pub. No.: WO2022/223412
PCT Pub. Date: Oct. 27, 2022

(65) Prior Publication Data
US 2024/0351797 A1    Oct. 24, 2024

(30) Foreign Application Priority Data
Apr. 21, 2021  (DE) .............. 102021110132

(51) Int. Cl.
*B65G 47/26*  (2006.01)
*B65G 17/20*  (2006.01)
(Continued)

(52) U.S. Cl.
CPC ............. *B65G 47/08* (2013.01); *B65G 17/20* (2013.01); *B65G 47/46* (2013.01); *B65G 2203/0208* (2013.01)

(58) Field of Classification Search
CPC ........ B65G 17/20; B65G 47/08; B65G 47/26; B65G 47/261; B65G 47/268
(Continued)

(56) References Cited

U.S. PATENT DOCUMENTS 6,702,095 B2    3/2004 Heeswitjk et al.
7,581,632 B2 *  9/2009 Wallace ................. B65G 47/54
                                        198/817
(Continued)

FOREIGN PATENT DOCUMENTS

DE    102008025975 A1    12/2009
DE    102013218397 A1     3/2015
(Continued)

OTHER PUBLICATIONS

US 2023/0257210 A1, Aug. 17, 2023, Tinnacher At Al. (Year: 2023).*
(Continued)

*Primary Examiner* — Douglas A Hess
(74) *Attorney, Agent, or Firm* — Gardner, Linn, Burkhart & Ondersma LLP

(57) ABSTRACT

A method for operating an overhead conveyor for successive goods is disclosed, in which the goods are loaded onto the overhead conveyor one by one by means of an inward transfer means and are transferred outward at a predefined point of the overhead conveyor by means of a switch, the distance between successive goods on the overhead conveyor either being minimised if said successive goods are to be transferred outward at the same switch, or the distance between the successive goods on the overhead conveyor being increased in such a way that said distance corresponds to the minimum outward transfer distance if the successive goods are not to be transferred outward at the same switch.

11 Claims, 1 Drawing Sheet

(51) Int. Cl.
*B65G 47/08* (2006.01)
*B65G 47/46* (2006.01)

(58) Field of Classification Search
USPC .............................. 198/418.7, 460.1, 460.3
See application file for complete search history.

(56) References Cited

U.S. PATENT DOCUMENTS

| | | | | |
|---|---|---|---|---|
| 8,201,681 | B2* | 6/2012 | Schiesser | B65G 47/844 |
| | | | | 198/460.1 |
| 8,240,456 | B2* | 8/2012 | Duchemin | B65G 47/29 |
| | | | | 198/460.1 |
| 9,708,089 | B2* | 7/2017 | Lang | B65B 35/24 |
| 10,781,052 | B2* | 9/2020 | Fourney | B65G 43/10 |
| 11,180,323 | B2* | 11/2021 | Middelberg | B65G 47/295 |
| 11,459,188 | B2* | 10/2022 | Schroader | G05B 19/05 |
| 11,629,014 | B1* | 4/2023 | Dwivedi | B65G 47/46 |
| | | | | 198/413 |
| 11,691,825 | B2* | 7/2023 | Murray | G06M 11/00 |
| | | | | 198/502.2 |
| 11,975,458 | B2* | 5/2024 | Mueller | B26D 1/065 |
| 2008/0023294 | A1 | 1/2008 | Moore et al. | |

FOREIGN PATENT DOCUMENTS

| | | |
|---|---|---|
| DE | 102019215304 B3 | 8/2020 |
| EP | 0765826 A1 | 4/1997 |
| EP | 2789555 A1 | 10/2014 |
| EP | 3543181 A1 | 9/2019 |
| EP | 3800146 A1 | 4/2021 |
| GB | 2277071 A | 10/1994 |
| JP | H11165850 A | 6/1999 |
| JP | 2017095274 A | 6/2017 |

OTHER PUBLICATIONS

International Search Report of the International Searching Authority in English from corresponding Patent Cooperation Treaty (PCT) Application No. PCT/EP2022/059931, indicated completed on Aug. 2, 2022.

Written Opinion of the International Searching Authority in English from corresponding Patent Cooperation Treaty (PCT) Application No. PCT/EP2022/059931, indicated completed on Aug. 2, 2022.

Preliminary Report on Patentability of the International Searching Authority in English from corresponding Patent Cooperation Treaty (PCT) Application No. PCT/EP2022/059931, issued Oct. 24, 2023.

* cited by examiner

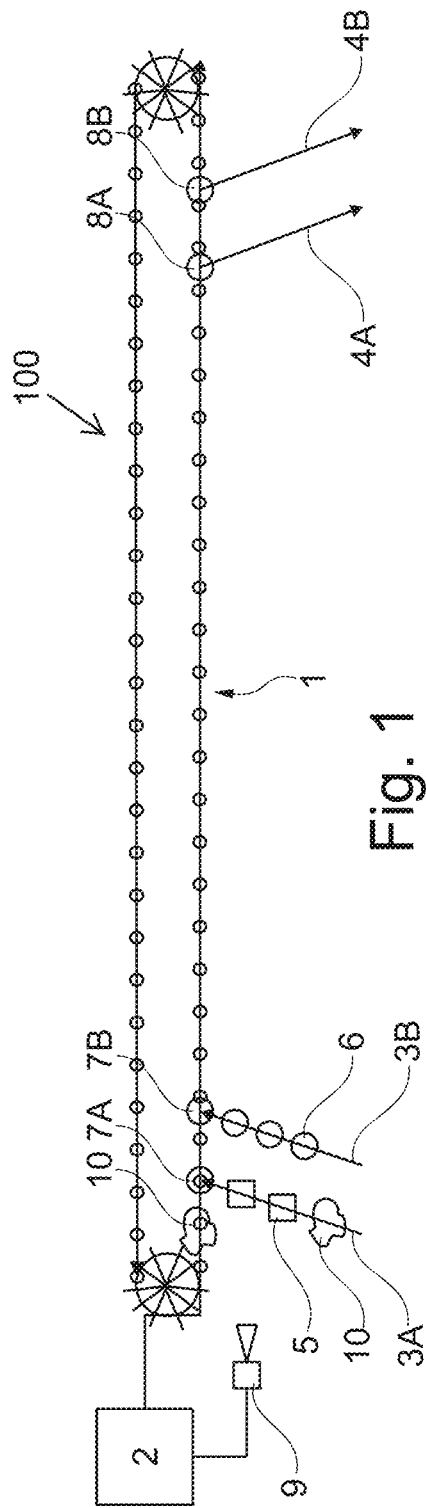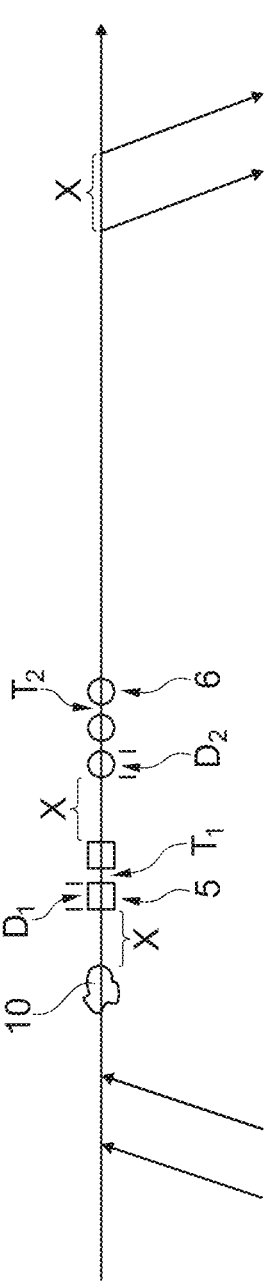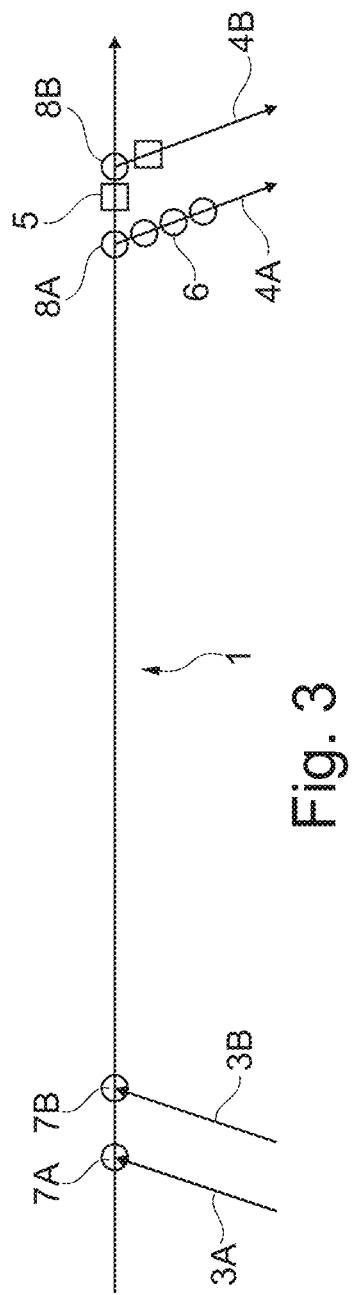
Fig. 1
Fig. 2
Fig. 3

METHOD FOR OPERATING A CONVEYOR FOR SUCCESSIVE GOODS, AND CORRESPONDING CONVEYOR SYSTEM

CROSS REFERENCE TO RELATED APPLICATION

The present application is a national stage application of PCT/EP 2022/059931 filed on Apr. 13, 2022, which claims the benefit of German Application 10 2021 110 132.8, filed on Apr. 21, 2021.

TECHNICAL FIELD AND BACKGROUND

Method for operating a conveyor for goods following one behind another, and corresponding conveying system The invention relates to a method for operating a conveyor for goods following one behind another, in which the goods are fed onto the conveyor one after another in an introduction means, and are discharged at a predetermined location of the conveyor via a switch point.

The conveyors are preferably so-called overhead conveyors for suspended goods which are either accommodated in bags, pouches etc. or are transported by means of hangers which are each engaged in adapters and then moved via conveyor chains running at the top.

EP 2 789 555 A1 discloses e.g. a device for order-orientated provision of individual goods for a plurality of orders from a warehouse, which comprises at least one intermediate store, connected to a warehouse, for intermediate storage of individual goods of at least one order, a respective gathering area, connected to the at least one intermediate store, for gathering the individual goods of the at least one completed order and a separating area, comprising a plurality of discharge lines, for order-orientated provision of the individual goods of the at least one completed order.

In this system, the fixed distance between the adapters and the fixed distance between the entrainers of the drive chain determine the distance between the transport of successive suspended goods or bags, irrespective of how wide the item of goods is in the conveying direction and to where in the system the item of goods is to be transported.

SUMMARY

In contrast thereto, the present invention provides a possibility in which the distance between the transport of successive goods, in particular suspended goods or bags, can be adjusted so as to optimise space.

In accordance with an embodiment of the invention, it has been recognised that when the goods are successively fed onto the conveyor in an introduction means and are discharged at a predetermined location of the conveyor via a switch point, wherein the distance between successive goods on the conveyor is either minimised when these successive goods are to be discharged at the same switch point, or the distance between the successive goods on the conveyor is enlarged such that it corresponds to the minimum discharge distance when the successive goods are not to be discharged at the same switch point, it is possible to arrange the goods having the same destination more closely on the conveying path of the conveyor and thus achieve an increase in capacity owing to the saving in space.

The distance can alternatively also be optimised for goods which do not have the same destination when, in that case, the distance is at least so large that the switch point can be actuated for the first discharge, the item of goods can be discharged and the switch point can then be closed, before the next item of goods is conveyed past the switch point.

In other words, goods having the same destination are introduced within a small distance of each other as a batch, whereas goods having a different destination are spaced apart from each other such that they can be discharged in a targeted manner and then together as a batch. This not only saves space on the conveyor but also saves discharge time at the switch point.

In accordance with one embodiment, the conveyor is an overhead conveyor having a chain drive and the chain drive defines a fixed division and the distance between the goods is fixed by the variable distance of the engagement in the chain. In other words, the distance between the goods is fixed by the engagement or cooperation with the chain. This typically has fixed distances between the entrainers or eyelets for engagement. This fixed division defines a grid within which the goods can be hooked into the chain (with or without adapters).

In addition, it may be advantageous if the distance between the goods also includes their respective thickness or extension in the conveying direction. The respective thickness can be predetermined and stored in order to be read in the introduction means. For this purpose, the introduction means can be equipped with an identification means in order e.g. to recognise the item of goods and to read the thickness from a database. The goods can thus be identified in the introduction means and/or the properties thereof, in particular thickness in the conveying direction, can be determined.

In addition or as an alternative, the distance between the successive goods on the conveyor can be adjusted for further optimisation using a thickness measuring device in the introduction means.

Within the scope of the invention, it is possible for the goods to be fed onto the conveyor one after another, in a singulated manner in an introduction means. In other words, the goods can be introduced individually in the introduction means via a singulator. Alternatively, a group or batch of goods can also be introduced from the introduction means as one. Such a group can then preferably be the group which includes at least the successive goods which are to be discharged at the same switch point.

It will be understood that corresponding conveyors comprise at least one gathering path comprising a plurality of introduction means and a plurality of switch points.

Optionally, the minimum discharge distance is determined by the distance between the successive switch points in the conveying direction. This can be selected such that, despite the high conveying speed, there remains sufficient time to actuate the switch point for the first discharge means, to discharge the item of goods and then to close the switch point, before the next item of goods is conveyed past the switch point.

It is expedient if the distance between the successive goods in the introduction means is fixed once upon introduction of the goods onto the conveyor.

In another embodiment, a corresponding conveying system has a conveyor for goods following one behind another and having at least one introduction means in order to feed the goods onto the conveyor one after another, and has at least one switch point in order to discharge goods at a predetermined location of the conveyor via the switch point, and having a controller which is configured to minimise the distance between successive goods on the conveyor by actuating the introduction means, when said goods are to be discharged at the same switch point, or to enlarge the distance between the successive goods on the conveyor such that it corresponds to the minimum discharge distance when said goods are not to be discharged at the same switch point.

In accordance with one embodiment, the conveyor is an overhead conveyor having a chain drive and the chain drive defines a fixed division and the distance between the goods is fixed by the variable distance of the engagement in the chain, and the controller is configured to introduce goods having the same destination within a small distance of each other as a batch, whereas goods having a different destination are spaced apart from each other such that they can be discharged in a targeted manner and then together as a batch.

Further details of the invention will become clear from the following description of exemplified embodiments by reference to the attached drawings.

DETAILED DESCRIPTION OF THE DRAWINGS

FIG. 1 is a schematic unifilar diagram of an overhead conveyor system during introduction;

FIG. 2 is a the schematic unifilar diagram of the overhead conveyor system of FIG. 1 after introduction; and FIG. 3 is a schematic unifilar diagram of the overhead conveyor system of FIG. 1 during discharge.

DETAILED DESCRIPTION OF THE PREFERRED EMBODIMENTS

Referring to the figures, an overhead conveyor system is designated as a whole by 100. It comprises a main conveying path 1 which is fed with goods 5, 6 via introduction means 3A, B and has discharge means 4A, B for conveying the goods in the system.

The overhead conveyor system 100 is monitored and controlled by means of a central controller 2. The controller 2 regulates the drive and also the introduction means 3 and the discharge means 4.

In addition, the controller 2 is connected to a thickness measuring device 9 in the introduction means 3 in order to determine the respective thickness of the goods in the conveying direction optically by means of light grids and then to adjust the mutual distance during introduction and thus on the conveying path 1.

The introduction means 3A, B have feed units 7A, B which are configured for the singulated feeding of the overhead conveyor goods 5, 6 on the conveying path 1. By way of corresponding actuation, a transport distance T between the goods from the respective introduction means can thus be adjusted on the path 1 in dependence upon their respective thickness D1, D2 and destination (discharge means).

The discharge means 4A, B can be coupled to the conveying path 1 via controllable switch points 8A, B or can be loaded with goods in a targeted manner. The discharge means 4 lead to packing stations (not shown).

The distance X in the conveying direction between the switch points 8A, B or the discharge means 4A, B corresponds to a minimum discharge distance which is selected such that despite the high conveying speed, there remains sufficient time to actuate the switch point 8A for the first discharge means 4A, to discharge the item of goods 6 and then to close the switch point 8A, before the next item of goods 5 is conveyed past the switch point 8A in order to arrive at the switch point 8B.

The goods 5, 6 in the respective introduction means 3A, B have been sorted in the inlet so that said goods in the present example are as determined by the order.

Therefore, the goods 5 all have a common destination, namely discharge means 4B, and the goods 6 have a different common destination, namely discharge means 4A. The further goods 10 serve for illustrating that they have other destinations, distances etc.

The goods 5 have a thickness D1 and the goods 6 have a thickness D2. As illustrated, the thickness D1 is greater than the thickness D2, and so the distance T1 between the goods 5 is greater than the distance T2 between the goods 6.

The distance T1 and also the distance T2 are thus minimised in the conveying direction with respect to the thickness D1, 2.

At the same time, the transport distance between the group of goods 5 and the group of goods 6 is equal to the minimum discharge distance X because these have different destinations.

The minimum absolute distance between two items of goods is fixed by virtue of the fact that the conveyor is an overhead conveyor which is configured having a chain drive and the chain drive defines a fixed division and the distance between the goods is fixed by the variable distance of the engagement in the chain.

In the present case, the goods 5, 6 are accommodated in hanging bags which are entrained (moved) from the drive chain via adapters in a known manner (cf. EP 3 480 142 A1).

The invention claimed is:

1. A method for operating a conveyor, wherein the conveyor is an overhead conveyor having a chain and a chain drive, the chain defining fixed divisions and the distance between the goods is fixed by the goods cooperation with the chain, the method comprising the steps of:
feeding the goods onto the conveyor one after another;
discharging the goods at a predetermined location of the conveyor via a switch point; and
minimizing a distance between successive goods on the conveyor when successive goods are to be discharged at the same switch point or enlarging the distance between the successive goods on the conveyor such that it corresponds to a minimum discharge distance when the successive goods are not to be discharged at the same switch point,
wherein the goods having the same destination are introduced within a small distance of each other as a batch, whereas goods having a different destination are spaced apart from each other such that they can be discharged in a targeted manner and then together as a batch.

2. The method for operating a conveyor as claimed in claim 1, wherein said minimizing the distance between the successive goods on the conveyor when the successive goods are to be discharged at the same switch point is further based on the successive goods belonging to a shared order and/or destination.

3. The method for operating a conveyor as claimed claim 1, further comprising adjusting the distance between the successive goods on the conveyor for further optimisation using a thickness measuring device.

4. The method for operating a conveyor as claimed in claim 1, further comprising providing a conveyor with gathering path having a plurality of introduction means and a plurality of switch points.

5. The method for operating a conveyor as claimed in claim 1, further comprising identifying the goods and/or the properties thereof when the goods are feed to the conveyor are determined.

6. The method for operating a conveyor as claimed in claim 1, further comprising determining thickness of the goods in the conveying direction, when the goods are feed to the conveyor.

7. A method for operating a conveyor, wherein the conveyor is an overhead conveyor having a chain and a chain drive, the chain drive defining fixed divisions and the distance between the goods is fixed by the goods cooperation with the chain, the method comprising the steps of:
feeding the goods onto the conveyor one after another;
discharging the goods at a predetermined location of the conveyor via a switch point;
minimizing a distance between successive goods on the conveyor when the successive goods are to be discharged at the same switch point or enlarging the distance between the successive goods on the conveyor such that it corresponds to a minimum discharge distance when the successive goods are not to be discharged at the same switch point,
wherein the goods having the same destination are introduced within a small distance of each other as a batch, whereas goods having a different destination are spaced apart from each other such that they can be discharged in a targeted manner and then together as a batch; and
determining the minimum discharge distance based on the distance between the successive switch points in the conveying direction.

8. A method for operating a conveyor, wherein the conveyor is an overhead conveyor having a chain and a chain drive, the chain drive defining fixed divisions and the distance between the goods is fixed by the goods cooperation with the chain, the method comprising the steps of:
feeding the goods onto the conveyor one after another;
discharging the goods at a predetermined location of the conveyor via a switch point;
minimizing a distance between successive goods on the conveyor when the successive goods are to be discharged at the same switch point or enlarging the distance between the successive goods on the conveyor such that it corresponds to a minimum discharge distance when the successive goods are not to be discharged at the same switch point,
wherein the goods having the same destination are introduced within a small distance of each other as a batch, whereas goods having a different destination are spaced apart from each other such that they can be discharged in a targeted manner and then together as a batch; and
wherein said feeding includes fixing the distance between the successive goods upon introduction of the goods onto the conveyor.

9. A conveying system comprising:
an overhead chain conveyor for goods following one behind the other;
at least one feed unit to feed the goods onto the overhead chain conveyor one after another;
the overhead chain conveyor having at least one switch point in order to discharge goods at a predetermined location of the overhead chain conveyor via the switch point;
a controller which is configured to minimise the distance between successive goods on the overhead chain conveyor when said goods are to be discharged at the same switch point, or to enlarge the distance between the successive goods on the overhead chain conveyor such that it corresponds to a minimum discharge distance when said goods are not to be discharged at the same switch point.

10. The conveyor system as claimed in claim 9, wherein the overhead conveyor includes a chain and a chain drive, the chain defining fixed divisions, and the distance between the goods is fixed by the goods cooperation with the chain.

11. The conveyor system as claimed in claim 9, wherein the controller is configured to introduce goods having the same destination within a small distance of each other as a batch, whereas goods having a different destination are spaced apart from each other such that they can be discharged in a targeted manner and then together as a batch.

* * * * *